US012247118B2

(12) United States Patent
Efimov et al.

(10) Patent No.: US 12,247,118 B2
(45) Date of Patent: Mar. 11, 2025

(54) METHOD FOR PRODUCING A RUBBER-PLASTIC COMPOSITE

(71) Applicant: Continental Reifen Deutschland GmbH, Hannover (DE)

(72) Inventors: Konstantin Efimov, Hefei (CN); Anna-Lena Dreier, Hannover (DE); Klaus Hülsmann, Haltern am See (DE); Andreas Pawlik, Recklinghausen (DE); Marco Kormann, Fuerth (DE); Maximilian Drexler, Herzogenaurach (DE)

(73) Assignee: Continental Reifen Deutschland GmbH, Hannover (DE)

( * ) Notice: Subject to any disclaimer, the term of this patent is extended or adjusted under 35 U.S.C. 154(b) by 438 days.

(21) Appl. No.: 17/753,777

(22) PCT Filed: Sep. 1, 2020

(86) PCT No.: PCT/EP2020/074257
§ 371 (c)(1),
(2) Date: Mar. 14, 2022

(87) PCT Pub. No.: WO2021/052740
PCT Pub. Date: Mar. 25, 2021

(65) Prior Publication Data
US 2022/0372256 A1 Nov. 24, 2022

(30) Foreign Application Priority Data

Sep. 16, 2019 (DE) ...................... 10 2019 214 073.4

(51) Int. Cl.
| | |
|---|---|
| *B29C 45/72* | (2006.01) |
| *B29B 11/12* | (2006.01) |
| *B29B 13/04* | (2006.01) |
| *B29C 45/14* | (2006.01) |
| *B29C 70/68* | (2006.01) |
| *B29C 71/02* | (2006.01) |
| *C08J 3/24* | (2006.01) |
| *C08L 15/00* | (2006.01) |
| *B29K 21/00* | (2006.01) |
| *B29K 77/00* | (2006.01) |
| *B29L 31/50* | (2006.01) |

(52) U.S. Cl.
CPC ............ *C08L 15/005* (2013.01); *B29B 11/12* (2013.01); *B29B 13/04* (2013.01); *B29C 45/1418* (2013.01); *B29C 45/7207* (2013.01); *B29C 71/02* (2013.01); *C08J 3/244* (2013.01); *C08J 3/245* (2013.01); *C08J 3/247* (2013.01); *B29K 2021/003* (2013.01); *B29K 2077/00* (2013.01); *B29L 2031/50* (2013.01); *C08J 2315/00* (2013.01); *C08J 2477/00* (2013.01); *C08L 2312/00* (2013.01)

(58) Field of Classification Search
CPC ..... B29C 35/16; B29C 45/7207; B29C 71/02; B29C 70/683; C08J 3/244; C08J 3/245; C08J 3/247; C08J 2477/00; C08L 2312/00
See application file for complete search history.

(56) References Cited

U.S. PATENT DOCUMENTS

| | | | |
|---|---|---|---|
| 4,774,651 | A | 9/1988 | El-Ibiary et al. |
| 5,976,451 | A | 11/1999 | Skaja et al. |
| 6,287,501 | B1 | 9/2001 | Rowley |
| 2005/0155690 | A1 | 7/2005 | Park |
| 2013/0030109 | A1 | 1/2013 | Pawlik et al. |
| 2015/0306854 | A1 | 10/2015 | Frueh et al. |
| 2017/0320301 | A1* | 11/2017 | Dederichs ............... B32B 27/18 |
| 2017/0349749 | A1* | 12/2017 | Dederichs ................. C08L 9/00 |

FOREIGN PATENT DOCUMENTS

| | | |
|---|---|---|
| CN | 104870188 A | 8/2015 |
| EP | 0274046 A1 | 7/1988 |
| EP | 0916277 A1 | 5/1999 |
| EP | 1555110 A1 | 7/2005 |
| JP | 2010022582 A | 2/2010 |
| WO | 9843795 A1 | 10/1998 |

(Continued)

OTHER PUBLICATIONS

International Search Report dated Nov. 27, 2020 of International application PCT/EP2020/074257 which is application is based on.
2020Q06290 Unknown / Fest verbunden ganz ohne Haftvermittler, Feb. 2016.
2022Q00442 Evonik Industries AG / High-Performance Polymers in Plastic-Rubber Composites, No date.
2020Q06291 Bex Gert-Jan et al. / Two-component injection moulding of thermoset rubber in combination with thermoplastics by thermally separated mould cavities and rapid heat cycling, Apr. 2017.

(Continued)

*Primary Examiner* — Robert B Davis

(57) ABSTRACT

A method for producing a rubber-plastic composite, including the steps of (a) shaping an unvulcanized elastomer, (b) partially vulcanizing the shaped elastomer at a temperature of at least 140° C. up to a degree of vulcanization in the range from 10% to 40%, (c) cooling the partially vulcanized elastomer to a temperature of less than 100° C. within less than 20 minutes, (d) overmolding the partially vulcanized elastomer with a plastic, and (e) heat treating the partially vulcanized elastomer overmolded with a plastic at a temperature in the range from 100° C. to 170° C. for a duration of from 5 minutes to 5 hours to complete the vulcanization and form a rubber-plastic composite. The method further relates to a rubber-plastic composite obtainable by the method according to the invention and also to a shoe comprising the rubber-plastic composite obtainable by the method according to the invention.

20 Claims, No Drawings

(56) References Cited

FOREIGN PATENT DOCUMENTS

WO 2011138300 A1 11/2011

OTHER PUBLICATIONS

Chinese Office Action dated Jun. 26, 2023 from corresponding Chinese Patent Application No. 202080064782.9.

\* cited by examiner

METHOD FOR PRODUCING A RUBBER-PLASTIC COMPOSITE

The present invention relates to a method for producing a rubber-plastic composite, comprising the steps of (a) shaping an unvulcanized elastomer, (b) partially vulcanizing the shaped elastomer at a temperature of at least 140° C. up to a degree of vulcanization in the range from 10% to 40%, (c) cooling the partially vulcanized elastomer to a temperature of less than 100° C. within less than 20 minutes, (d) overmolding the partially vulcanized elastomer with a plastic, and (e) heat treating the partially vulcanized elastomer overmolded with a plastic at a temperature in the range from 100° C. to 170° C. for a duration of from 5 minutes to 5 hours to complete the vulcanization and form a rubber-plastic composite. The present invention further relates to a rubber-plastic composite obtainable by the method according to the invention and also to a shoe comprising the rubber-plastic composite obtainable by the method according to the invention.

Elastomers are used in numerous areas, for example in the form of seals, damping elements, covers or membranes. If the need is to permanently attach rubber parts, composite parts of such elastomers with a hard component have proven useful. For example, in automobile manufacture, the hard component is traditionally composed of metal. However, in particular in order to significantly reduce weight, i.e. to achieve lightweight construction, plastics parts are finding increasing use nowadays as hard component. They are light, do not corrode and can be processed into complex shaped parts in an injection molding process. A composite of a rubber component and a plastics component is usually produced using an adhesion promoter or an adhesive. However, the use of adhesion promoters or adhesives requires a multistage, complex and often also environmentally polluting process. Furthermore, the adhesive strength is not always sufficient.

A process known as the plastic-rubber composite process (also referred to as the P&R process) has been proposed in order to solve this problem. Certain rubber/plastic combinations such as SBR/PPE or XNBR/PA can be directly bonded to one another using this process without adhesion promoter or adhesive. To this end, the rubber component is applied to the plastic and only then vulcanized—in the presence of the plastic—to result in adhesion of the rubber component to the plastic. This process can be carried out in one or two stages. The procedure in the two-stage injection molding process is similar to that in the two-stage production of two-color injection-molded parts. To this end, first the rigid shaped part is produced for example by injection molding, extrusion, embossing or compression molding and, in a second step, is brought into contact with the optionally preshaped rubber component and exposed to the conditions for vulcanization of the rubber. The contacting of the rigid shaped part with the rubber may take place by compression molding, embossing, injection molding or extrusion. The single-stage injection molding process proceeds analogously to the single-stage two-color injection molding process. In this case, one injection molding machine is equipped for thermoplastic processing and the other is equipped for rubber processing. The mold or the cavity for the rubber compound is heated to the predefined vulcanization temperature, which should be below the solidification temperature of the plastic compound. The P&R process is described, for example, in WO 2011/138300 A1 and in "High-Performance Polymers in Plastic-Rubber Composites" by Evonik Industries (see https://www.vestamid.com/sites/lists/RE/DocumentsHP/Plastic-rubbercomposites-EN.pdf).

However, plastics components suitable for the P&R process must be extremely rigid, hard and thermally stable so that they can survive the vulcanization process. As a result, these plastic-rubber composite parts are unsuitable for certain applications, such as for example in sports shoes. In addition, the injection molds required for the P&R process are generally very expensive.

It was therefore an object of the present invention to provide a method for producing a rubber-plastic composite which does not have the disadvantages described above. In particular, the intention is to provide a method which makes possible a composite of rubber and plastic without the use of adhesion promoters, which is not just suitable for the production of rubber-plastic composites with rigid plastics component and which can be conducted using relatively simple/inexpensive molds.

This object is achieved by means of the embodiments characterized in the claims.

In particular, the invention provides a method for producing a rubber-plastic composite, comprising the steps of (a) shaping an unvulcanized elastomer, (b) partially vulcanizing the shaped elastomer at a temperature of at least 140° C. up to a degree of vulcanization in the range from 10% to 40%, (c) cooling the partially vulcanized elastomer to a temperature of less than 100° C. within less than 20 minutes, (d) overmolding the partially vulcanized elastomer with a plastic, and (e) heat treating the partially vulcanized elastomer overmolded with a plastic at a temperature in the range from 100° C. to 170° C. for a duration of from 5 minutes to 5 hours to complete the vulcanization and form a rubber-plastic composite.

The present invention is based on the consideration that the disadvantages of the adhesive-bonding process and of the P&R process could be avoided when the fully vulcanized rubber part could be overmolded with the plastic, that is to say if the P&R process could be conducted in reverse. However, the rubber component is no longer active after the vulcanization and then no longer forms a stable bond with the plastic. However, it has now surprisingly been found that this problem can be solved according to the invention by initially only partially vulcanizing the rubber component and then overmolding it with plastic. Since the rubber part has not yet completely heated through, a stable bond can be formed with the plastic during the injection molding process or during a thermal aftertreatment. As a result, the rubber component achieves an optimal degree of vulcanization and the bonding between rubber and plastic is reinforced or completed.

In step (a) of the method according to the invention, first an unvulcanized elastomer is shaped. The term elastomer is to be understood as meaning dimensionally stable yet elastically deformable plastics having a glass transition point below room/operating temperature. Any unvulcanized elastomer suitable for the respectively envisaged application may be used for the method according to the invention. Preferably, the unvulcanized elastomer is selected from the group consisting of polyacrylate rubber (ACM), ethylene-acrylate rubber (AEM/EAM), ethylene-propylene-diene copolymer (EPDM), ethylene-propylene copolymer (EPM), fluoro rubber (FKM), (partially) hydrogenated nitrile rubber (HNBR), carboxylated nitrile rubber (XNBR), nitrile-butadiene rubber (NBR), natural rubber (NR), styrene-butadiene rubber (SBR), methyl-vinyl-silicone rubber (VMQ), polybutadiene rubber (BR), polyisoprene rubber (IR), and combinations thereof. The unvulcanized elastomer used is particularly preferably (partially) hydrogenated nitrile rubber (HNBR). The unvulcanized elastomer may be used unblended or blended with at least one further rubber component, especially with one of the above-mentioned rubber types, for example in the form of an EPM/EPDM or SBR/BR blend. Of particular importance here is EPM or EPDM or an EPM/EPDM blend.

The unvulcanized elastomer may be used together with suitable mixture ingredients which for example comprise at least one crosslinker or crosslinker system (crosslinking agent and accelerator). Preference is given to using peroxides as crosslinkers due to their better heat aging resistance. Examples of further mixture ingredients include fillers, vulcanization activators, oils, processing aids, plasticizers and/or aging stabilizers, and optionally further additives such as for example fibers and color pigments. In this regard, reference is made to the general art of elastomer mixing technology. According to a preferred embodiment of the present invention, the elastomer contains additives selected from the group consisting of vulcanization agents, vulcanization activators, oils and fillers.

The unvulcanized elastomer is shaped, that is to say brought into the intended form. This may be done by any suitable method known in rubber technology, for example by compression molding, embossing, injection molding or extrusion. According to a preferred embodiment of the present invention, step (a) of the method according to the invention is conducted in a vulcanizing press. This has the advantage that the next step (b) of the vulcanization can be conducted simultaneously or directly afterwards.

In step (b) of the method according to the invention, the shaped elastomer is vulcanized at a temperature of at least 140° C. up to a degree of vulcanization in the range from 10% to 40%. The vulcanization step can be performed in a usual manner. The vulcanization is preferably conducted in a vulcanizing press. The optimum vulcanization conditions depend on the chosen rubber mixture and in particular on the vulcanization system used and the chosen shape of the shaped elastomer. Suitable vulcanization temperatures are, for example, in the range from 140° C. to 250° C., preferably in the range from 170° C. to 200° C. The vulcanization times are not only guided by the elastomer mixture, but also by the vulcanization temperatures and by the geometry of the parts. They are generally between seconds and 15 minutes; lower temperatures and thicker rubber parts will require longer times. The vulcanization is preferably effected under elevated pressure, especially under a pressure in the range from 10 to 200 bar.

According to the invention, the vulcanization is not conducted completely but only up to a degree of vulcanization in the range from 10% to 40%. Preferably, the vulcanization is conducted up to a degree of vulcanization of from 10% to 30%, more preferably up to a degree of vulcanization of from 10% to 20%. The degree of vulcanization can be determined by any suitable method known to those skilled in the art. For example, this may be determined from a rheometer curve measured in accordance with DIN 53529. This defines a degree of vulcanization of 0% for the lowest value for the tensile stress over time and a degree of vulcanization of 100% for the highest value for the tensile stress over time. According to a preferred embodiment of the present invention, the vulcanization is conducted at least until dimensional stability of the shaped elastomer is achieved, that is to say up to the so-called "curing point". This can also be gathered from a rheometer curve. This has the advantage that the shape of the elastomer no longer changes in the further method steps.

According to a preferred embodiment of the present invention, steps a) and b) are conducted simultaneously in a vulcanizing press. In this way, the manufacturing process can be significantly simplified.

In step (c) of the method according to the invention, the partially vulcanized elastomer is cooled to a temperature of less than 100° C. within less than 20 minutes. This step serves to minimize or completely avoid further vulcanization of the partially vulcanized elastomer due to residual heat. According to a preferred embodiment of the method according to the invention, the cooling is effected in less than 10 minutes, more preferably in less than 5 minutes. It is further preferable for the partially vulcanized elastomer to be cooled to a temperature of less than 80° C., more preferably to less than 60° C. According to a particularly preferred embodiment of the present invention, the partially vulcanized elastomer is cooled to a temperature of less than 80° C. within less than 5 minutes.

In step (d) of the method according to the invention, the partially vulcanized elastomer is overmolded with a plastic. The plastic may be any plastic suitable for the respectively envisaged application. Preferably, the plastic is selected from the group consisting of polyamide (PA), polyphenylene ether (PPE), polyphthalamide (PPA), polyurethane (PU), polyether block amide (PEBA), and combinations thereof. According to a particularly preferred embodiment, this plastic is present in the form of a thermoplastic elastomer (TPE) or as a thermoplastic elastomer alloy with a rubber selected from the group consisting of polyacrylate rubber (ACM), ethylene-acrylate rubber (AEM/EAM), ethylene-propylene-diene copolymer (EPDM), ethylene-propylene copolymer (EPM), fluoro rubber (FKM), (partially) hydrogenated nitrile rubber (HNBR), carboxylated nitrile rubber (XNBR), nitrile-butadiene rubber (NBR), natural rubber (NR), styrene-butadiene rubber (SBR), methyl-vinyl-silicone rubber (VMQ), polybutadiene rubber (BR), polyisoprene rubber (IR), and combinations thereof, in the form of thermoplastic vulcanizates (TPE-Vs or TPVs).

Depending on the envisaged application, all suitable combinations of plastic and elastomer may be used for the method according to the invention. According to a preferred embodiment of the present invention, one of the following plastic/elastomer combinations is used: ACM with PA; AEM/EAM with PA; AEM/EAM with PPA; EPDM with PPE; EPDM with PA; FKM with PA; FKM with PPA; HNBR with PA; HNBR with PPA; NR/SBR with PPE; SBR with PPE; SBR/EPDM with PPE; SBR/NBR with PPE; VMQ with PA; VMQ with PPA; XNBR with PA. Very particularly preferably, the plastic used is polyamide (PA) and the elastomer used is (partially) hydrogenated nitrile rubber (HNBR). In principle, any polyamide may be used here, for example PA6, PA66, PA610, PA88, PA612, PA810, PA108, PA9, PA613, PA614, PA812, PA128, PA1010, PA10, PA814, PA148, PA1012, PA1 1, PA1014, PA1212 and PA12. Among these, particular preference is given to PA12 and PA612.

The plastic may contain further suitable additives. According to a preferred embodiment of the present invention, however, the plastic contains no reinforcers or fillers, especially no glass fibers or graphite.

The step of overmolding the partially vulcanized elastomer with the plastic may be effected in any manner known to those skilled in the art. According to a preferred embodiment of the present invention, the partially vulcanized elastomer after step (c) is placed into an injection mold and step (d) is conducted in said mold. It has been found, in the context of the present invention, that the usual temperatures and pressures during the injection molding process and the usual duration thereof are sufficient for the vulcanization of the rubber component to proceed.

In step (e) of the method according to the invention, the partially vulcanized elastomer overmolded with a plastic is heat treated at a temperature in the range from 100° C. to 170° C. for a duration of from 5 minutes to 5 hours to complete the vulcanization and form a rubber-plastic composite. According to a preferred embodiment, the heat treatment is effected at a temperature of at least 100° C. and less than 140° C., and more preferably at a temperature of at least 120° C. and less than 140° C. According to a further preferred embodiment, the heat treatment is effected for a duration of from 1 to 3 hours. It is particularly preferable to conduct the heat treatment at a temperature of at least 120° C. and less than 140° C. for a duration of from 1 to 3 hours. The heat treatment may in particular be conducted at a temperature of 130° C. for a duration of around 2 hours. In contrast to the vulcanization, the heat treatment is preferably conducted under a pressure in the range from 0.5 to 5 bar, particularly preferably under standard pressure.

The method according to the invention has the advantage over conventional methods that the use of adhesion promoters or adhesives for bonding rubber and plastic can be dispensed with. Preferably, the method according to the invention accordingly does not include the use of an adhesion promoter. Furthermore, this method can be conducted using molds customary in plastics technology and does not require the special molds that are necessary for the P&R process. Lastly, reinforcement of the plastics component using reinforcers or fillers, for example glass fibers or graphite, can likewise be dispensed with since the plastics component is subjected merely to a heat treatment and not vulcanization.

The present invention further relates to a rubber-plastic composite obtainable by the process according to the invention.

The rubber-plastic composite according to the invention may be used in numerous applications, for example in complex components, assemblies or composites for automobile construction. However, the rubber-plastic composite according to the invention may also be used in shoes, for example. Accordingly, the present invention further relates to a shoe comprising the rubber-plastic composite according to the invention. This is preferably a soccer shoe, the sole of the soccer shoe constituting the plastics component of the rubber-plastic composite and the cleats constituting the rubber component of the rubber-plastic composite.

The invention will now be explained in more detail on the basis of examples.

EXAMPLES

Rubber-plastic composites were produced by the method according to the invention, using an HNBR rubber and a PA612 plastic. The vulcanization was effected at a temperature of 140° C. up to a degree of vulcanization of 20%. Thereafter, it was cooled to a temperature of 40° C. within 20 minutes. This was followed by overmolding with the plastic and subsequent heat treatment at 130° C. for 2 hours.

The rubber-plastic composites obtained were subjected to a separation test in order to determine how much force is required for the separation (i.e. until complete detachment or until detachment until tearing) of rubber and plastic. The results are presented in table 1 below. For each example, four samples were produced and measured, with the table below giving the average value for each of the four samples and also the standard deviation in parentheses.

TABLE 1

| | Sample width [mm] | Force [N] | Separation resistance [N/mm] | Cohesive fraction [%] |
| --- | --- | --- | --- | --- |
| Example 1 (n = 4) | 14.08 (0.81) | 89.1 (8.1) | 6.3 (0.4) | 96 (3) |
| Example 2 (reference) (n = 4) | 14.36 (0.08) | 59.7 (9.5) | 4.2 (0.7) | 5 (4) |

Example 1 describes the measurement results for a rubber-plastic composite that was produced by the method according to the invention, whereas in the method for producing the rubber-plastic composite according to example 2 the final step of thermal aftertreatment was omitted. It is found that the composite produced by the method according to the invention requires a much higher force to separate the two components and hence it has a much higher separation resistance. This confirms that the method according to the invention can be used to produce a stable rubber-plastic composite.

The invention claimed is:

1. A method for producing a rubber-plastic composite, comprising the following steps:
    a) shaping an elastomer which is unvulcanized to form a shaped elastomer,
    b) partially vulcanizing the shaped elastomer at a temperature of at least 140° C. up to a degree of vulcanization in the range from 10% to 40% to form a partially vulcanized elastomer,
    c) cooling the partially vulcanized elastomer to a temperature of less than 100° C. within less than 20 minutes,
    d) overmolding the partially vulcanized elastomer with a plastic, and
    e) heat treating the partially vulcanized elastomer overmolded with the plastic at a temperature in the range from 100° C. to 170° C. for a duration of from 5 minutes to 5 hours to complete the vulcanization and thus forming the rubber-plastic composite;
wherein the plastic is polyamide (PA) and the elastomer is (partially) hydrogenated nitrile rubber (HNBR).

2. The method as claimed in claim 1, wherein the partially vulcanized elastomer in step c) is cooled to a temperature of less than 80° C. within less than 5 minutes.

3. The method as claimed in claim 1, wherein the heat treatment in step e) is conducted at a temperature of at least 120° C. and less than 140° C. for a duration of from 1 to 3 hours.

4. The method as claimed in claim 1, wherein the plastic contains no reinforcers or fillers.

5. The method as claimed in claim 1, wherein the plastic contains no glass fibers or graphite.

6. The method as claimed in claim 1, wherein the method does not include the use of an adhesion promoter.

7. The method as claimed in claim 1, wherein steps a) and b) are conducted simultaneously in a vulcanizing press.

8. The method as claimed in claim 1, wherein the partially vulcanized elastomer after step c) is placed into an injection mold and step d) is conducted in said mold.

9. The method as claimed in claim 1 further comprising incorporating the rubber-plastic composite into a shoe.

10. A method for producing a rubber-plastic composite, comprising the following steps:
- a) shaping an elastomer which is unvulcanized to form a shaped elastomer,
- b) partially vulcanizing the shaped elastomer at a temperature of at least 140° C. up to a degree of vulcanization in the range from 10% to 40% to form a partially vulcanized elastomer,
- c) cooling the partially vulcanized elastomer to a temperature of less than 100° C. within less than 20 minutes,
- d) overmolding the partially vulcanized elastomer with a plastic, and
- e) heat treating the partially vulcanized elastomer overmolded with the plastic at a temperature in the range from 100° C. to 170° C. for a duration of from 5 minutes to 5 hours to complete the vulcanization and thus forming the rubber-plastic composite.

11. The method as claimed in claim 10, wherein a plastic and the elastomer are a combination selected from the group consisting of polyacrylate rubber (ACM) with polyamide (PA); ethylene-acrylate rubber (AEM/EAM) with PA or polyphthalamide (PPA); ethylene-propylene-diene copolymer (EPDM) with polyphenylene ether (PPE) or PA; fluoro rubber (FKM) with PA or PPA; (partially) hydrogenated nitrile rubber (HNBR) with PA or PPA; natural rubber (NR)/styrene-butadiene rubber (SBR), SBR, SBR/EPDM or SBR/nitrile-butadiene rubber (NBR) with PPE; methyl-vinyl-silicone rubber (VMQ) with PA or PPA; and carboxylated nitrile rubber (XNBR) with PA.

12. The method as claimed in claim 10, wherein the elastomer is selected from the group consisting of polyacrylate rubber (ACM), ethylene-acrylate rubber (AEM/EAM), ethylene-propylene-diene copolymer (EPDM), ethylene-propylene copolymer (EPM), fluoro rubber (FKM), (partially) hydrogenated nitrile rubber (HNBR), carboxylated nitrile rubber (XNBR), nitrile-butadiene rubber (NBR), natural rubber (NR), styrene-butadiene rubber (SBR), methyl-vinyl-silicone rubber (VMQ), polybutadiene rubber (BR), polyisoprene rubber (IR), and combinations thereof.

13. The method as claimed in claim 10, wherein the plastic is selected from the group consisting of polyamide (PA), polyphenylene ether (PPE), polyphthalamide (PPA), polyurethane (PU), polyether block amide (PEBA), and combinations thereof.

14. The method as claimed in claim 10, wherein the plastic is present in the form of a thermoplastic elastomer (TPE) or as a thermoplastic elastomer alloy with a rubber selected from the group consisting of polyacrylate rubber (ACM), ethylene-acrylate rubber (AEM/EAM), ethylene-propylene-diene copolymer (EPDM), ethylene-propylene copolymer (EPM), fluoro rubber (FKM), (partially) hydrogenated nitrile rubber (HNBR), carboxylated nitrile rubber (XNBR), nitrile-butadiene rubber (NBR), natural rubber (NR), styrene-butadiene rubber (SBR), methyl-vinyl-silicone rubber (VMQ), polybutadiene rubber (BR), polyisoprene rubber (IR), and combinations thereof.

15. The method as claimed in claim 10, wherein steps a) and b) are conducted simultaneously in a vulcanizing press.

16. The method as claimed in claim 10, wherein the method does not include the use of an adhesion promoter.

17. The method as claimed in claim 10, wherein in step b) the vulcanization is conducted up to a degree of vulcanization in the range from 10% to 20%, wherein the partially vulcanized elastomer in step c) is cooled to a temperature of less than 80° C. within less than 5 minutes, and wherein the heat treatment in step e) is conducted at a temperature of at least 120° C. and less than 140° C. for a duration of from 1 to 3 hours.

18. The method as claimed in claim 10, wherein the plastic contains no reinforcers or fillers.

19. The method as claimed in claim 10 further comprising incorporating the rubber-plastic composite into a shoe.

20. The method as claimed in claim 1, wherein in step b) the vulcanization is conducted up to a degree of vulcanization in the range from 10% to 20%.

* * * * *